Figure 1:
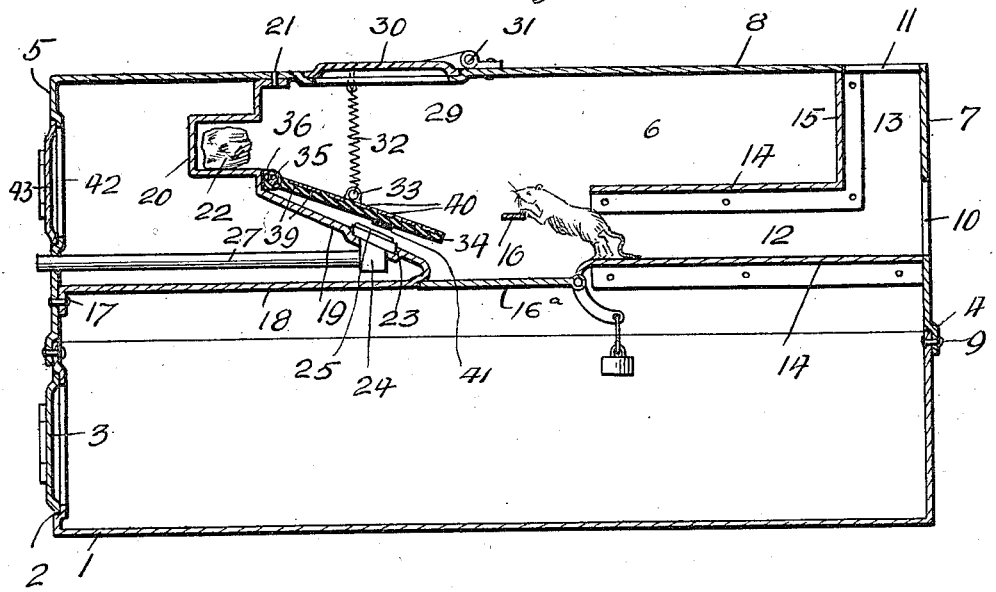

R. CLIFFORD.
ELECTRIC RAT TRAP.
APPLICATION FILED JULY 31, 1911.

1,045,676.

Patented Nov. 26, 1912.
2 SHEETS—SHEET 1.

WITNESSES:
Samuel Payne
Ralph C. Evert.

INVENTOR.
R. Clifford.
BY
ATTORNEYS.

R. CLIFFORD.
ELECTRIC RAT TRAP.
APPLICATION FILED JULY 31, 1911.
1,045,676.
Patented Nov. 26, 1912.
2 SHEETS—SHEET 2.
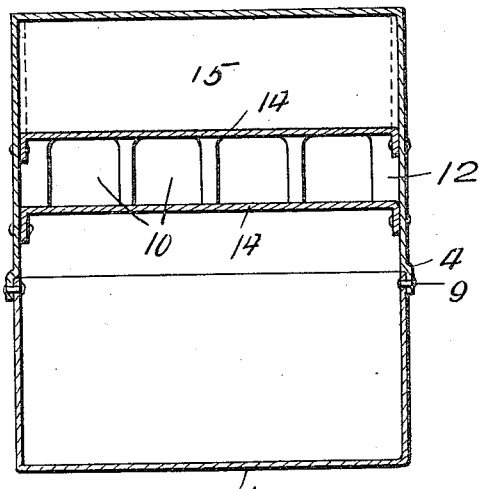
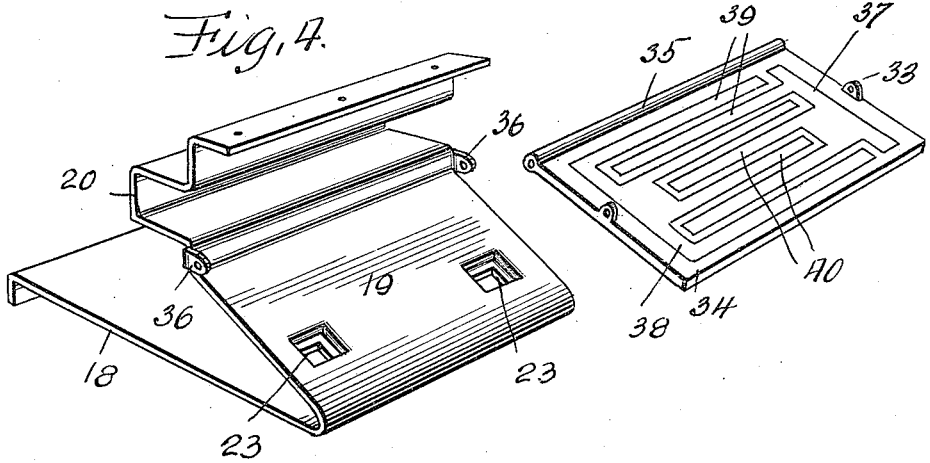
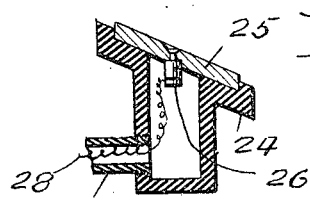
WITNESSES:
INVENTOR.
R. Clifford.
BY
ATTORNEYS.

UNITED STATES PATENT OFFICE.

ROBERT CLIFFORD, OF GREENSBURG, PENNSYLVANIA, ASSIGNOR OF ONE-THIRD TO JOHN D. LINARDOS AND ONE-THIRD TO FRANK CONTAXES, OF WESTMORELAND COUNTY, PENNSYLVANIA.

ELECTRIC RAT-TRAP.

1,045,676.  Specification of Letters Patent.  Patented Nov. 26, 1912.

Application filed July 31, 1911. Serial No. 641,530.

*To all whom it may concern:*

Be it known that I, ROBERT CLIFFORD, a citizen of the United States of America, residing at Greensburg, in the county of Westmoreland and State of Pennsylvania, have invented certain new and useful Improvements in Electric Rat-Traps, of which the following is a specification, reference being had therein to the accompanying drawing.
This invention relates to electric rat traps, and my invention aims to provide:— first, an electric rat trap that can be safely used in connection with a suitable source of electrical energy, as an ordinary 110 volt current used in warehouses, wharves and other buildings or structures; second, a trap having a double entrance for rodents and hinged doors that permit of easy access being had to the trap to arrange the parts thereof and rebait the same; third, to furnish a trap with a normally open circuit adapted to be closed by the weight of a rodent's body, whereby the rodent will be shocked and eventually electrocuted; and fourth, a trap that is not liable to injury by ordinary use, inexpensive to manufacture, and highly efficient for exterminating rodents.

The invention furthermore aims to accomplish the above results by the novel construction, combination and arrangement of parts to be hereinafter specifically described and then claimed.

Reference will now be had to the drawing, wherein like numerals designate corresponding parts throughout the several views, in which:—

Figure 2:
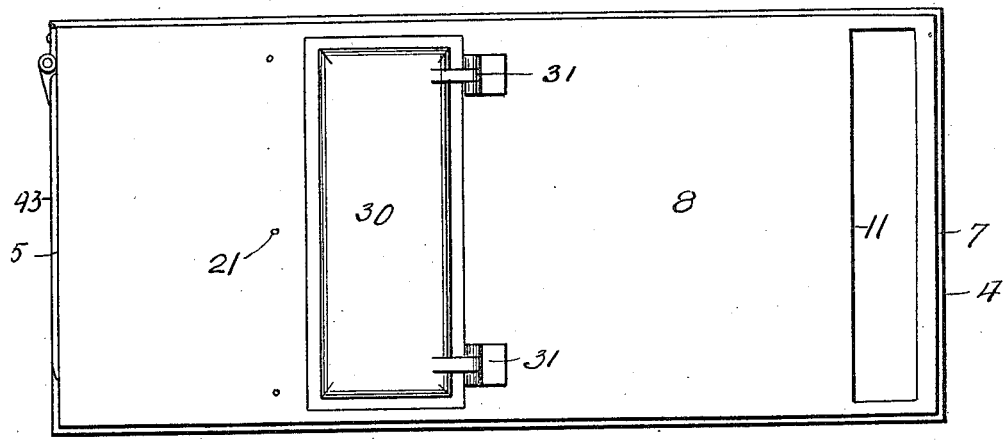

Figure 1 is a longitudinal sectional view of a portion of a trap in accordance with this invention, Fig. 2 is a plan of the same, Fig. 3 is a cross sectional view of the trap, Fig. 4 is a perspective view of a detached electrode support and bait holder, Fig. 5 is a perspective view of a detached electrode platform, and Fig. 6 is an enlarged vertical sectional view of one of the electrodes.

A trap in accordance with this invention is preferably made of metal whereby it can be sterilized and maintained in a sanitary condition without injury to the material from which the trap is made. The trap comprises a rectangular box having the top thereof open and the rear end of said box is provided with a doorway 2 for a hinged door 3, whereby easy access can be had to the box for removing shocked or electrocuted rodents' bodies from the same.

Mounted upon the upper edges of the box 1 are the lower reamed edges 4 of a rectangular casing having a rear wall 5, side walls 6, a front wall 7 and a top plate 8. The lower reamed or offset edges of the casing are preferably secured to the upper edges of the box by rivets 9 or other fastening means.

The front wall 7 is provided with openings 10 and the top plate 8, adjacent to said front wall, with opening 11. These openings are in communication with passages 12 and 13 formed by horizontal partitions 14 and a vertical partition 15 connecting the side walls 6 of the casing. The inner ends of the partitions 14 extend to a point approximately central of the casing and adjacent to the open inner end of the passage 12 there is a transverse bar 16 forming a support for the fore feet of a rodent, as will presently appear.

Secured to the rear wall 5, at a point above the lower edges of the casing, as at 17, is a horizontal electrode support and bait holder 18 having an inclined portion 19 formed integral with a transverse bait holder 20 having the upper edges thereof riveted or otherwise secured, as at 21 to the top plate 8. The bait holder 20 is channel-shaped in cross section and is adapted to hold a bait 22. The inclined portion 19 of the support 18 has sockets 23 for insulators 24 and each insulator has an electrode or contact plate 25 provided with a binding post 26 extending into the hollow insulator. Each insulator has a rearwardly extending tube 27 preferably made of an insulation material, as fiber, these tubes extending through the rear wall 5 of the casing. Extending into the tubes are positive and negative wires 28 that are in circuit with a suitable source of electrical energy and are connected to the binding posts 26 of the electrodes 25.

The top plate 8 is provided with a transverse doorway or opening 29 and normally closing the doorway or opening 29 is a door 30 hinged, as at 31 to the top plate 8.

Connected to the inner side of the door 30 are the upper convolutions of coiled retractile springs 32, these springs having the lower convolutions thereof connected to apertured lugs 33 carried by the ends of an electrocuting platform 34, made of insulation, as fiber. The upper edge of the platform 34 has a barrel 35 pivotally mounted between apertured lugs or ears 36, carried by the upper edge of the inclined portion 19 of the support 18, at the ends thereof. Embedded in the platform 34 are contact bars 37 and 38 having extensions 39 and 40 arranged in parallelism. The extensions 40 are of a less length than the extensions 39 to provide sufficient clearance for connecting contact pieces 41 to the bars 37 and 38, these contact pieces extending through the platform 34 directly above the electrodes 25.

The rear wall 5 of the casing has a doorway 42 normally closed by a hinged door 43, this door permitting of easy access being had to the casing to assemble the interior parts thereof.

A rodent entering either of the openings 10 or 11 will pass through the passage 12 and jump on to the platform 34 to reach the bait 22, this movement of the rodent being facilitated by the bar 16. Immediately upon the rodent jumping on to the platform, the platform is lowered and the contact pieces 41 thereof engage the electrodes 35. The contact bars 37 and 38 are arranged whereby the body of the rodent connects said bars and thereby establishes an electric circuit, which if not sufficient to electrocute the rat, shocks the rat to that extent as to roll or be thrown off of the platform into the box 1, from which the rodent cannot escape.

The opening formed between the end of the passage 12 and the bait holder 18 is closed by a counter-balanced door 16ᵃ. If the rodent should miss the bar 16 and fall upon the door 16ᵃ, the weight of the rodent will open the door and the rodent will fall in the lower portion of the receptacle 1, the door 16 automatically closing after the weight of the rodent has passed off the same. The use of the door 16ᵃ, in the manner as stated, will trap the rodent in the lower portion of the receptacle if the rodent should not be electrocuted due to the fall against the door 16ᵃ which, as before stated, will open due to the weight of the animal thereon.

When the platform 34 is released of the weight of the rodent's body, the coiled retractile springs immediately restore the platform to its normal position, breaking the electrical circuit. The trap is then in condition to receive other rodents.

The bait 22 is placed within the trap through the medium of the doorway 29, and after the door 30 has been partially opened, the springs 32 can be disconnected from the door whereby the bait can be more easily placed in the holder. To avoid any accident, the wires 28 can be disconnected from the source of electrical energy or the current shut off.

What I claim is:—

1. In an electric trap, the combination with a suitable source of electrical energy, of a box, a casing located upon said box and having one end thereof provided with passage ways, an electrode support arranged in the opposite end of said casing, electrodes carried by and insulated from said support and in circuit with opposite sides of said source of electrical energy, a spring supported inclined platform arranged above said support and adapted to be placed in engagement with said electrodes by the weight of a rodent's body, and contact bars arranged upon and insulated from said platform and each other and adapted to be placed in circuit with said electrodes.

2. In an electric trap, the combination with a suitable source of electrical energy, a casing located upon said box and having one end thereof provided with a passage, an electrode support arranged in the opposite end of said casing, electrodes carried by and insulated from said support and in circuit with opposite sides of said source of electrical energy, a bait holder arranged at the upper edge of said support, an inclined platform pivotally connected to the upper edge of said support, contact bars arranged upon and insulated from said platform and each other and adapted to be placed in circuit with said electrodes by a lowering movement of said platform, and means within said casing and adapted to normally support said platform in an elevated position.

3. In an electric rat trap, a box, a casing located upon said box and having doorways formed therein, doors closing said doorways, one end of said casing having openings formed therein, partitions arranged in one end of said casing and providing passages in communication with said openings, an electrode support arranged in the opposite end of said casing, electrodes carried by and insulated from said support and in circuit with opposite sides of said source of electrical energy, a platform pivotally connected to said support, contact bars arranged upon and insulated from said platform and each other and adapted to be placed in circuit with said electrodes by a lowering movement of said platform, and means carried by one of said doors and normally supporting said platform in an elevated position.

In testimony whereof I affix my signature in the presence of two witnesses.

ROBERT CLIFFORD.

Witnesses:
MAX H. SROLOVITZ,
J. P. APPLEMAN.

Copies of this patent may be obtained for five cents each, by addressing the "Commissioner of Patents, Washington, D. C."